United States Patent Office 3,413,319
Patented Nov. 26, 1968

3,413,319
REMOVING ALUMINUM ALKOXIDES
FROM ESTERS
Arthur Ibbotson and Harry James Twitchett, Manchester,
England, assignors to Imperial Chemical Industries Limited, London, England, a corporation of Great Britain
No Drawing. Filed Apr. 14, 1965, Ser. No. 447,963
Claims priority, application Great Britain, Apr. 21, 1964,
16,501/64
5 Claims. (Cl. 260—345.8)

ABSTRACT OF THE DISCLOSURE

Process for the purification of organic compounds, particulay esters and alcohols, contaminated with aluminum in the form of an alkoxide or an alkoxy aluminoxane which comprises agitating said organic compound with an aqueous solution of a water soluble sulphate and removing by physical means the precipitated aluminum compound thereby produced. The process is particularly applicable to organic compounds prepared by methods employing the use of aluminum alkoxide as catalyst.

---

This invention relates to the purification of organic compounds in particular to the removal therefrom of aluminium present in the form of an alkoxide, or an alkoxy aluminoxane derivative.

Aluminium alkoxides are finding increasing use as industrial chemicals and are widely employed as catalysts in a number of chemical reactions.

For example aluminium alkoxides are employed as catalysts in—

(a) Ester formation, for example $$C_6H_5OH + C_3H_7COOH \rightarrow C_6H_5OCOC_3H_7$$

as described in United States Patent No. 3,106,570.

(b) Urethane formation, for example

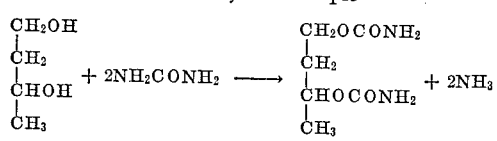

as described in United States Patent No. 2,837,560.

(c) The reduction of aldehydes by the Meerwein-Pondorff-Verley reaction, for example—

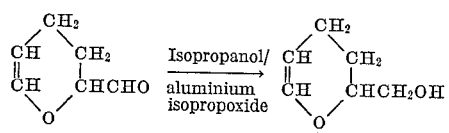

(d) The preparation of esters by the Tischenko reaction, for example—

$$2CH_2=CH-CHO \rightarrow CH_2=CH-COO-CH_2CH=CH_2$$

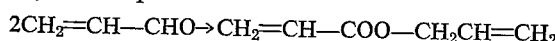

Acrolein tetramer $$2C_2H_5CHO \rightarrow C_2H_5 \cdot COO-C_3H_7$$

(e) Transesterification and alcoholysis especially where there is a risk of polymerisation or isomerisation, for example in the alcoholysis of methyl methacrylate with olefinic alcohols as described in J. Org. Chem. 1947, 12, 226–231.

(f) The reaction of polyethylenic compounds with unsaturated aldehydes, for example methyl abietate and acrolein as described in U.S. Patent No. 2,568,426, (g) The preparation of lactones, for example—

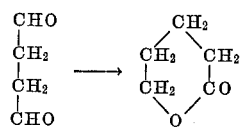

as described in U.S. Patent No. 2,526,702.

(h) The polymerisation of propylene oxide as described in Chemical Age 1958, 80, 192 and of phenylglycidyl ether as described in Chemical Age 1958, 80, 190.

Whilst in some instances it is unnecessary to remove the aluminium alkoxide residues from the product of reactions such as those mentioned above, it is always preferable to remove the aluminium residues and in many cases it is essential, for example when the product is to be employed in a further catalysed reaction where the catalyst would be inactivated in the presence of aluminium alkoxide residues.

Several methods have been suggested for the removal of aluminium alkoxide residues but these all suffer from disadvantages.

Thus for example the reaction product from a Meerwein-Pondorff-Verley reduction of an aldehyde contains at least a part of the desired alcohol in the form of its alkoxide with aluminium. Methods which may be used for isolation of the alcohol include either: (a) treatment with hot water or (b) acidifications. Treatment with water is in general very inconvenient as the alkoxide is converted to a gelatinous precipitate which is extremely difficult to remove by normal methods, for example filtration. Treatment with acid is in many cases inappropriate because of the nature of the alcohol concerned, for example, in the reduction of 2-fromyl-3,4-dihydro-2H-pyran to the corresponding 2-hydroxymethyl compound by this reaction, removal of the aluminium by acid treatment is inadvisable as the alcohol readily cyclises in the presence of acid to 6,8-dioxabicyclo-[3,2,1]-octane.

In other instances of the use of aluminum alkoxides it may be desired to react the product with an acid to effect further reaction. Thus in the polymerisation of acrolein tetramer (made from acrolein dimer via the Tischenko reaction using aluminium isopropoxide as catalyst) it is found that use of the crude product necessitates the disadvantageous employment of an amount of acid catalyst greatly in excess of that which is required when aluminium alkoxide free acrolein tetramer is used. In this case attempted removal of the aluminium alkoxide residues by addition of water leads to precipitation of aluminium in a form which is difficult to remove by filtration. Removal of the aluminium by acid or alkali treatment is not possible as the first leads to polymerisation of the product and the second to hydrolysis of the ester linkages therein.

It has now been found that aluminium alkoxide residues present normally in the form of an alkoxide, or an alkoxy aluminoxane may be satisfactorily removed from organic compounds by treatment of the organic compound with an aqueous solution of a water soluble sulphate, when the aluminium is precipitated in a readily filterable form, probably as a basic sulphate.

A compound substantially free from aluminium may then be obtained by filtration, separation and drying. The aluminium is precipitated in an easily removable form and the deleterious effects obtained using the acid or alkali treatments of the prior art are minimised or completely obviated by the newly discovered process.

Thus according to the present invention there is provided a process for the purification of organic compounds contaminated with aluminium in the form of an alkoxide or an alkoxy aluminoxane which comprises agitating said organic compound with an aqueous solution of a water soluble sulphate and removing by physical means the precipitated aluminium compound thereby produced.

The process of the present invention is applicable to any organic compound which is contaminated with aluminium in the form of an alkoxide or alkoxy aluminoxane.

The process is particularly applicable to organic compounds which are the products of a reaction in which an aluminium alkoxide has been used as catalyst.

Thus, organic compounds to which the present process has been found to be particularly applicable are alcohols prepared by the Meerwein-Pondorff-Verley reaction and esters prepared by the Tischenko reaction, in both of which reactions an aluminium alkoxide is used as catalyst.

The Meerwein-Pondorff-Verley reaction comprises the selective reduction of a carbonyl group containing compound to the corresponding alcohol by heating with a secondary alcohol, e.g. isopropanol in the presence of a suitable catalyst, especially aluminium isopropoxide. The acetone formed is distilled off to force the reaction to completion.

$$RR'CO + R''_2CH(OH) \rightleftharpoons RR'CH(OH) + R''_2CO$$

The process is applicable to both aliphatic and aromatic aldehydes and ketones.

Examples of alcohols prepared by the above reaction to which the present process is applicable include crotyl alcohol, 2-chlorbutene-1-ol, 2,4-hexadiene-1-ol, trichlorethanol, furfuryl alcohol, 2-hydroxymethyl-3,4-dihydro-2H-pyran, 2-nitrobenzyl alcohol, cinnamyl alcohol, 2-styrylbenzyl alcohol, heptane-2-ol, methyl-4-pyridyl methanol, benzhydrol, cyclopentanol, borneol, fluorenol, cyclohex-2-ene-1-ol, pregnane-3,4 - 20 - triol and isopropyl benzhydrol-4-carboxylate.

The process is particularly valuable when applied to 2-hydroxymethyl-3,4-dihydro-2H-pyran to which acidic treatments cannot be applied.

The Tischenko reaction comprises the condensation of two molecules of an aldehyde or a mixture of aldehydes which may be aliphatic or aromatic, in the presence of an aluminium alkoxide catalyst to give an ester $$R \cdot CHO + R'CHO \longrightarrow R \cdot CH_2OCOR' + R'CH_2OCOR + R \cdot CH_2OCOR + R'CH_2OCOR'$$

When a single aldehyde is employed only one ester is obtained. When a mixture of aldehydes is employed the relative amounts of the products obtained will depend on the relative reactivities of the aldehydes used.

Examples of esters prepared by the above reaction to which the present process is applicable include methyl formate, ethylacetate, propylpropionate, isobutyl, isobutyrate, 3,4-dihydro-2H-pyran-2-methyl (3,4 - dihydro-2H-pyran-2-carboxylate), benzyl benzoate, furfuryl furoate, allyl acrylate, cinnamyl butyrate, furfuryl butyrate, benzyl acetate and benzyl acrylate.

The process is especially valuable when applied to the esters which contain vinyl ether groups (C=CH—O) and which may undergo polymerisation in the presence of acidic substances; acid treatment cannot therefore be used for example, with 3,4-dihydro-2H-pyran-2-methyl-(3,4-dihydro-2H-pyran-2-carboxylate) often referred to as acrolein tetramer.

The aluminium present as alkoxide or alkoxy-aluminoxane which is to be removed from the organic compound may be present in the form of a single compound or there may be a multiplicity of such compounds present. In particular the present process is applicable to the residue remaining in the product of a chemical reaction after an aluminium alkoxide has been used as catalyst.

The process of the present invention may be carried out by any suitable method, thus, for example, if the organic compound is a liquid, it may be simply agitated and thoroughly mixed with the aqueous solution of the water soluble sulphate, the precipitated aluminium compound removed by a physical means such as filtration or centrifuging and the organic liquid separated from the aqueous layer and dried. The precipitated aluminium compound is conveniently removed by filtration as it is in general precipitated in an easily filterable form.

Organic solvents can be employed to facilitate separation if desired, for example when the organic compound is a solid or is partly miscible with water. Suitable solvents include aromatic hydrocarbons such as benzene, toluene, the xylenes, aliphatic hydrocarbons such as linear or branched pentanes, hexanes, heptanes or octanes, halogenated hydrocarbons such as carbon tetrachloride, chloroform and trichlorethylene.

The process may be operated in a batchwise or continuous manner and may be operated at room temperature or above room temperature as desired.

The aqueous solution of the water soluble sulphate used in the present process may be any such solution and the strength of the solution may vary widely depending for example on the particular sulphate employed. It is preferred to use sulphates of which a dilute aqueous solution has a pH in the range 3.5 to 8.0.

It is generally preferred to employ the sulphates in the form of their concentrated aqueous solution.

Examples of water soluble sulphates suitable for the present process include sodium sulphate, potassium sulphate, ammonium sulphate, substituted ammonium sulphates such as tetramethyl ammonium sulphate, zinc sulphate, magnesium sulphate, manganese sulphate, aluminium sulphate, sodium ethyl sulphate, sodium benzyl sulphate and mixtures thereof.

Water soluble sulphates which have been found particularly useful are the sulphates of the alkali metals and ammonium sulphate.

By the use of the process of the present invention the amount of aluminium present as alkoxide or alkoxy aluminoxane in an organic compound can be reduced to a very low level easily and conveniently. When the process is applied to organic compounds such as acrolein tetramer made by a process utilising an aluminium alkoxide catalyst, which are later to be used in an acid catalysed reaction the content of aluminium derivatives is so much reduced that a much smaller amount of the acid catalyst is needed.

The invention is illustrated but not limited by the following examples in which all parts and percentages are by weight.

EXAMPLE 1

Preparation of 2-hydroxymethyl-3,4-dihydro-2H-pyran by Meerwein-Pondorff-Verley reduction of 2-formyl-3,4-dihydro-2H-pyran and removal of residual aluminium compound Distilled 2-formyl-3,4-dihydro-2H-pyran (410 parts, 2 mols), fractionated aluminium isopropoxide (374.6 parts, 1 mol, B.P. 140–146° C./10 mm. Hg) and drp isopropanol (1840 parts) were heated at reflux during 24 hours and the acetone evolved distilled off through a Dixon Gauze packed column. When evolution of acetone ceased the excess isopropanol was distilled off and there was obtained as residue a pale straw coloured slightly viscous oil. A solution of sodium sulphate (260 parts) in water (1 litre) was added to this residual oil with very fast stirring and there was produced a suspension of a readily filtered solid in an amber mobile liquid. After filtration and washing with sodium sulphate solution, benzene was added to facilitate further washing and drying. After distillation there was obtained a yield of 230 parts (55.2%) of water white mobile liquid (2-hydroxymethyl-3,4-dihydro - 2H - pyran) of refractive index 1.4764

(known value=1.4732) and analysing C=63.6% and H=8.7% ($C_6H_{10}O_2$ requires C=63.2% and H=8.8%).

The use of water in place of sodium sulphate solution in this experiment resulted in precipitation of an intractable unfilterable gel. Use of dilute acids yields the bicyclic derivative 6,8-dioxabicyclo[3,2,1]-octane and not the desired alcohol.

EXAMPLE 2

Removal of aluminium from 3,4-dihydro-2H-pyran-2-methyl(3,4-dihydro-2H-pyran-2-carboxylate)

To 100 parts of saturated sodium sulphate solution there was added with fast agitation 100 parts of the reaction product of 2-formyl-3,4-dihydro-2H-pyran with 0.9% of aluminium isopropoxide at 50° C. After stirring for 30 minutes the suspension was filtered, the layers separated, the organic layer dried by heating for 2 hours at 100° C. and 15 mm. Hg pressure and finally filtered from a trace of suspended material.

The aluminium content was found to be less than 50 p.p.m.; that of the original crude reaction product was 0.12%.

The purified product was 3,4-dihydro-2H-pyran-2-methyl(3,4-dihydro-2H-pyran - 2 - carboxylate)(acrolein tetramer).

In order to show the effect on acrolein tetramer of the above purification by the present process, samples of foamed polymers were prepared from acrolein tetramer using the crude acrolein tetramer, acrolein tetramer purified as above and a sample of acrolein tetramer which had been fractionally distilled.

The formulation used for the preparation of the foamed polymeric material was as follows:

|  | Parts |
|---|---|
| Acrolein tetramer | 100 |
| 4,4'-dihydroxydiphenyl-2,2-propane | 25 |
| Polysiloxane polyoxyalkylene block copolymer | 1.25 |
| Trichloromonofluoromethane | 20 |
| Catalyst, see Table 1. | |

Detailed results are given in Table 1.

These results clearly indicate that the removal of aluminium from crude ester permits usage of a significantly reduced amount of acid catalyst, the amount required being about the same as that needed to prepare satisfactory foam from ester purified by distillation.

TABLE 1.—PREPARATION OF FOAMS FROM VARIOUSLY PURIFIED 3,4-DIHYDRO-2H-PYRAN-2-METHYL (3,4-DIHYDRO-2H-PYRAN-2-CARBOXYLATE)

| Foam No. | Condition of ester | Catalyst (ml.) 10% $HBF_4$ in polypropylene glycol, M.W. 425 | Cream time M. | Cream time S. | Rise time M. | Rise time M. | Scale of foam preparation (g.) | Comments |
|---|---|---|---|---|---|---|---|---|
| 1 | Crude | 0.35 | | | | | 30 | Solution polymerised but failed to foam. |
| 2 | do | 0.50 | 2 | 32 | 3 | 37 | 30 | White rigid foam, negligible scorch. |
| 3 | do | 0.60 | 1 | 30 | 2 | 11 | 30 | White foam, bad scorch at center. |
| 4 | do | 0.70 | | 57 | 1 | 24 | 30 | As for 3. |
| 5 | Purified as Example 2 | 0.70 | | 10 | | 11 | 30 | Very small hard high density foam, black center. |
| 6 | do | 0.35 | | 10 | | 13 | 30 | As for 3. |
| 7 | do | 0.06 | | 45 | 1 | 25 | 20 | As for 2. |
| 8 | Fractionally distilled | 0.09 | | 30 | 1 | 25 | 30 | Do. |

What we claim is:
1. A process for the purification of 3,4-dihydro-2H-pyran-2-methyl(3,4-dihydro-2H-pyran-2-carboxylate) contaminated with aluminum in the form of an alkoxide or an alkoxy aluminoxane which comprises mixing said 3,4-dihydro - 2H - pyran - 2 - methyl(3,4 - dihydro - 2H-pyran-2-carboxylate) with an aqueous solution of a water soluble inorganic sulfate, agitating the resulting mixture thereby forming an aluminum containing precipitate in said mixture and separating the purified 3,4-dihydro-2H-pyran - 2 - methyl(3,4 - dihydro - 2H - pyran - 2 - carboxylate) from said aluminum containing precipitate.

2. The process of claim 1 which includes filtering the aluminum containing precipitate from said mixture, allowing said mixture to stratify into an aqueous layer and a layer comprising purified 3,4-dihydro-2H-pyran-2-methyl(3,4-dihydro-2H-pyran-2-carboxylate) and separating said purified 3,4-dihydro-2H-pyran-2-methyl(3,4-dihydro-2H-pyran-2-carboxylate) from said aqueous layer.

3. The process of claim 1 which includes adding an organic solvent to said mixture.

4. The process of claim 1 wherein the aqueous solution of water soluble inorganic sulfate has a pH ranging from 3.5 to 8.0.

5. The process of claim 1 wherein the water soluble inorganic sulfate is selected from the group consisting of alkali metal and ammonium sulfates.

References Cited

UNITED STATES PATENTS 1,459,852   6/1923   Mugdon et al. _____ 260—494
1,785,166   12/1930   Young _____ 260—494

HENRY R. JILES, *Primary Examiner.*

J. M. FORD, *Assistant Examiner.*